March 5, 1929.  C. M. CLARKE  1,704,174
INSULATING SHEET AND METHOD OF MAKING SAME
Filed July 29, 1926
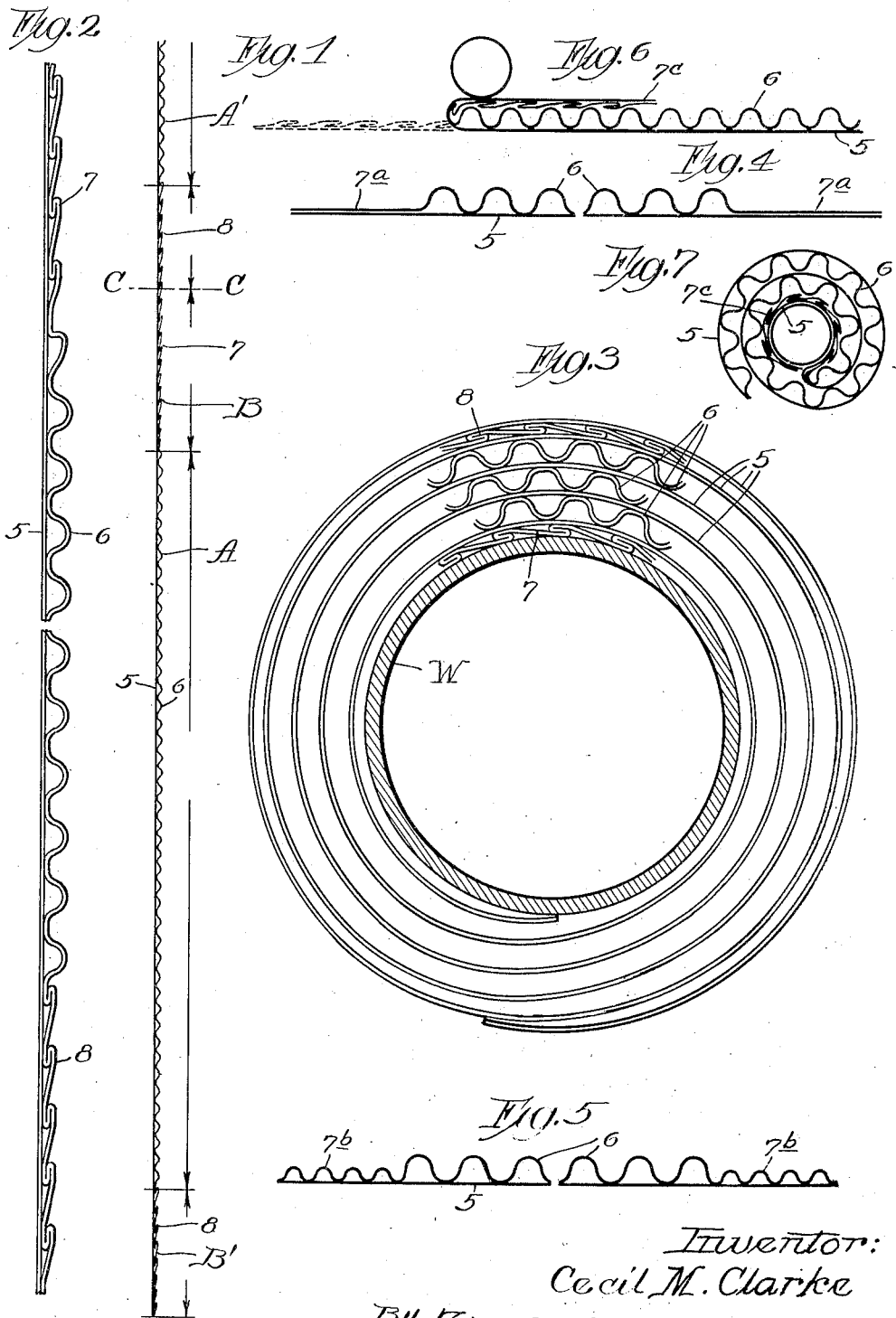
Inventor:
Cecil M. Clarke
By Fisher, Cowle, Clapp & Soans, Attys.

Patented Mar. 5, 1929.

1,704,174

UNITED STATES PATENT OFFICE.

CECIL M. CLARKE, OF CHICAGO, ILLINOIS.

INSULATING SHEET AND METHOD OF MAKING SAME.

Application filed July 29, 1926. Serial No. 125,611.

The present invention has relation more particularly to that class of insulating sheets composed of a relatively flat sheet having attached thereto, a sheet of corrugated material adapted to form air cells when the composite sheet is applied to the surface of a pipe, boiler, or like article to be covered. An example of this type of insulating sheet is shown in Letters Patent No. 1,128,759 granted to me February 16, 1915, and the improvements thereover will readily appear.

The object of the present invention is to so construct the composite insulating sheet that the part thereof that comes next to or surrounds the pipe to be covered, shall fit smoothly around the pipe and thus avoid the necessity of using a supplemental liner, and the expense incident to making and applying the same in three pieces instead of one sheet.

A further object is to so form the insulating sheet that the outermost ply or layer thereof, or a part of a convolution, shall lap snugly and without a seriously abrupt joint about the outer surface of the inner plies of the corrugated sheet. To this end, the invention consists primarily of a composite insulating sheet comprising a relatively flat sheet having attached thereto a corrugated sheet, a portion or portions of said corrugated sheet being crushed, flattened, or thinner, and other portions of said corrugated sheet being left unflattened. The invention consists further in features of novelty hereinafter described, and particularly pointed out in the claims at the end of the specification.

On the drawings:—

Fig. 1 is an edge view of the composite sheet embodying my invention.

Fig. 2 is a view showing a portion of the sheet illustrated in Fig. 1 on a larger scale.

Fig. 3 is a view of the finished sheet after it has been coiled in readiness to be applied to a pipe.

Figs. 4 and 5 are edge views of modified forms of sheets, and

Figs. 6 and 7 are edge views of another modification.

As shown, the composite sheet comprises a relatively flat sheet 5 preferably of asbestos, on the surface of which sheet is attached a corrugated sheet 6, that may also be made of asbestos or other suitable material.

In the composite sheet comprising my present invention, that part of the sheet that will immediately encircle the pipe or like article to be covered, will have the corrugations crushed or flattened so that the ply of the sheet that surrounds the pipe shall fit smoothly and snugly against the same, as indicated at 7 on the drawings. So also the portion of the composite sheet that forms the outer ply or layer of the covering or portion thereof will have its corrugations crushed or flattened as shown at 8 on the drawing. The extent of the sheet that shall be thus crushed or flattened will, of course, vary, according to the size of the pipe or other article for which the sheet is intended to form a covering. The flattened part 7 of the sheet that will form the innermost ply of the finished covering should be of such length as to completely encircle the pipe for which the covering is designed. Preferably also, the outer end of the sheet, that is to say, the end that forms a lap or portion thereof or part of a convolution on the outer surface of the covering should be crushed or flattened to a sufficient extent to form a very gradually tapering lap or flap on the outer surface of the covering and, if desired, the length of the flattened portion 8 may be such as to completely encircle the covering one or more times. This flattening of a portion or portions of the composite sheet is accomplished by preferably passing the sheet through crushing or flattening rolls, or means for producing smaller corrugations or straightening out the sheet, all as set forth in an application for Letters Patent filed by me July 29, 1926, Serial No. 251,612. When the corrugated sheet is thus subjected to the action of crushing rolls, the end corrugations of the sheets will be pressed firmly down or flattened against the sheet 5 to such extent as to preferably encircle the pipe W or other article to be covered. In this way a very snug union between the pipe and the insulating sheet is obtained without the formation of any abrupt joint at the inner end of the sheet, which would occur if the end of the sheet were left unflattened. So, also, it will be seen that where the end corrugations of that portion of the sheet that forms the outermost ply or cover, or a portion thereof, are flattened or crushed as at 8, such crushed or flattened portion of the sheet will fit snugly around the intermediate unflattened corrugated portions of the composite sheet and will prevent the formation of any abrupt joint such as would result if the outer portion or cover portion of the sheet were left uncrushed.

With my improved construction, also, the necessity of employing an outer covering sheet is avoided, although if such outer covering sheet be used, it will be seen that it can be placed smoothly around the outer surface of the coiled sheet without showing an abrupt joint, such as would occur if the outer portion of the sheet were not flattened.

By my present invention I am enabled to provide a composite insulating sheet which has the advantage of affording more confined air cells of greater insulating capacity with comparatively few layers or plies of the sheet, and at the same time insures a snug fitting of the sheet against the pipe or other articles to be covered, and avoids any abrupt joints or surfaces upon the exterior surface of the covering.

It is understood, of course, that the length of the flattened or crushed portions of my improved sheet may be varied, and that the length of the uncrushed portions may also be varied to correspond with the size of the pipe or like article to be covered and with the number of plies or wrappings of the sheet to be placed about the pipe.

In Fig. 2 of the drawings the composite insulating sheet is shown as having an uncrushed portion sufficiently long to have three plies or layers about the pipe but obviously this number may be varied as desired. Thus, for example, if the covering is desired for a three inch pipe, the flattened or crushed portion 7 that will come immediately next to the pipe should be approximately nine inches in length; and if there are to be three plies of the uncrushed sheet, as illustrated in Fig. 3, such uncrushed portions of the sheets should be approximately thirty inches long; so, also, if the outermost ply of the covering is to have a flattened portion 8 sufficient to completely encircle the covering, this flattened portion should be approximately twelve inches long.

In forming the individual sheets from which the individual pipe coverings are to be made, these sheets will be cut from a continuous sheet, parts of which have been crushed or flattened, and parts of which have been left uncrushed, as illustrated in Fig. 1 of the drawings, and as more particularly described in the companion application for Letters Patent filed by me of even date. In practice, it is desirable that the individual sheets shall be formed from a long or continuous sheet that subsequently will be cut up into individual sheets and by reference to Fig. 1 it will be seen that in flattening the continuous sheets, the flattened portions that will constitute the innermost ply of the insulating covering and the outermost ply will come together, and the continuous sheet will be severed transversely of the flattened portion so as to leave enough of said flattened portion at one end of each individual sheet to form the innermost ply of the insulating covering, and to leave enough of the flattened portion at the opposite end of said individual sheet to form the outermost ply, or a part thereof, of the insulating covering. In Fig. 1 of the drawings is illustrated a part of the continuous strip from which the individual strips that form the individual pipe covering will be cut, and in this figure, the unflattened portions of the sheet are designated as A and A', while the flattened portions are designated B and B'. The flattened portion B may be severed transversely upon the line C—C so as to form an individual sheet having a flattened portion 7, say, nine inches in length, adapted to form the innermost ply of an insulating covering for a three inch pipe and such individual sheet will have an outer flattened end portion 8, say, six inches long, adapted to partially form the outermost ply of the individual covering, without making any abrupt joint. It will be understood, however, that if it is desired that the individual pipe covering should have an outer lap or several complete laps of the flattened sheet, the length of such flattened portion can be correspondingly increased.

In addition to effecting the periodic crushing or flattening of predetermined portions of the composite sheet, as by crushing the corrugations 6 as indicated at 7 to produce thinner portions, said flattening may be produced by causing the withdrawing means on which the sheet is wound or which receives the sheet from the rollers, to intermittently feed or pull the same faster than usually fed, thereby causing portions of the sheet to be kept flat or pulled out flat and relatively plain and smooth between the corrugated portions, as indicated at 7ª in Fig. 4. These flat portions will be used in the same manner as the crushed portions or corrugations heretofore described. Or, the crushed or flattened portions may be smaller corrugations formed intermittently in the same manner as the crushing of the full corrugations is effected, as shown at 7ᵇ in Fig. 5 of the drawings.

In lieu of leaving the portions 7 unpasted, that is, skipping at these intervals in the pasting operation, these portions may be pasted, in which event the pasting operation is continuous. The portions may then be turned in or over against the corrugations 6, as shown at 7ᶜ in Figure 6 of the drawing, to present the flat sheet 5 to the pipe instead of the flattened portion or corrugations 7 or 7ª, and the corrugated side of the portion 7ᶜ will adhere to the corrugations 6. However, in either instance, a portion which is flattened or has small corrugations will be presented in contact with or closely adjacent the pipe, and in the case of the part 7ᶜ, with the flat sheet 5 between and in direct contact with the pipe, so that the insulating efficiency or capacity is enhanced.

While I have described what I regard as the preferred embodiment of my invention, it will be seen that the details of the invention may be varied within wide scope without departing therefrom and that features of the invention may be employed without its adoption as an entirety.

Having thus described my invention, what I claim as new and desire to secure by Letters Patent is:—

1. As a new article of manufacture, a composite insulating sheet comprising a relatively flat elongated sheet having attached thereto a corrugated sheet, the corrugations of which are arranged transversely of the elongated sheet, an end portion of said corrugated sheet being abruptly flattened, and other portions of said corrugated sheet being left unflattened.

2. As a new article of manufacture, a composite insulating sheet comprising a relatively flat elongated sheet having attached thereto a corrugated sheet, the corrugations of which are arranged transversely of the elongated sheet, the corrugations at the end parts of said corrugated sheet being abruptly flattened and the intermediate corrugations being left unflattened, the line of demarcation between the flattened and unflattened portions being between two adjacent corrugations.

3. A method of forming a corrugated covering for pipes or the like, that consists in crushing or flattening that portion of the corrugated covering that will lie next to and substantially wholly around the pipe, while leaving the greater portion of said covering relatively uncrushed.

4. A method of forming a corrugated insulating covering for pipes or the like, that consists in abruptly crushing and flattening those portions of the corrugated covering that will form the inner and outer ends thereof to a uniform thickness, while leaving the intermediate portions relatively uncrushed.

5. A method of forming a corrugated insulating covering for pipes or the like, that consists in abruptly flattening those portions of the corrugated covering that will form the inner and outer ends thereof to make at least one complete turn about the pipe, while leaving the intermediate portions relatively unflattened.

6. An insulating sheet having corrugated intermediate portions and flattened end portions, one of said end portions being turned back against the corrugated portions to fit next to a pipe or article to be covered.

7. An insulating sheet having corrugated intermediate portions and flattened end portions, and a flat sheet attached along said portions, at least one flattened end portion being turned over against the corrugated portion to present the flat sheet to the pipe or other object to be covered, at the inner ply.

8. An insulating sheet having corrugated intermediate portions and flattened end portions, and a flat sheet attached along said portions, at least one flattened end portion being turned over against the corrugated portion and secured thereto to present the flat sheet to the pipe or other object to be covered.

9. An insulating sheet including a flat sheet, and another sheet attached thereto and having corrugated intermediate portions and terminal portions of less thickness than the intermediate portions, the line of demarcation between the respective portions being abrupt.

10. An insulating sheet including a flat sheet, and another sheet pasted thereto and having corrugated intermediate portions and terminal portions of less thickness than the intermediate portions, the second sheet being pasted throughout its length and having its inner terminal, which engages a pipe, folded in against the intermediate portion for adherence thereto and to present the flat sheet portion thereof to and in direct contact with the pipe.

CECIL M. CLARKE.